US012092539B2

United States Patent
Endo et al.

(10) Patent No.: US 12,092,539 B2
(45) Date of Patent: Sep. 17, 2024

(54) FORCE SENSOR

(71) Applicant: NIDEC COPAL ELECTRONICS CORPORATION, Tokyo (JP)

(72) Inventors: Takayuki Endo, Sano (JP); Yoko Yasutomi, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 529 days.

(21) Appl. No.: 17/361,984

(22) Filed: Jun. 29, 2021

(65) Prior Publication Data

US 2021/0325266 A1      Oct. 21, 2021

Related U.S. Application Data

(63) Continuation of application No. PCT/JP2019/047066, filed on Dec. 2, 2019.

(30) Foreign Application Priority Data

Jan. 28, 2019    (JP) .................... 2019-012323

(51) Int. Cl.
  *G01L 1/22*   (2006.01)
  *G01L 1/26*   (2006.01)
  *G01L 5/161*  (2020.01)
(52) U.S. Cl.
  CPC .............. *G01L 1/26* (2013.01); *G01L 1/2206* (2013.01); *G01L 5/161* (2013.01)
(58) Field of Classification Search
  None
  See application file for complete search history.

(56) References Cited

U.S. PATENT DOCUMENTS

| 5,945,606 | A | 8/1999 | Tokunaga et al. | |
| 9,481,089 | B2* | 11/2016 | Matsuzawa | G01L 5/009 |
| 10,527,509 | B2* | 1/2020 | Mokhbery | G01L 1/2218 |
| 10,589,431 | B2* | 3/2020 | Nakayama | B25J 9/047 |
| 10,647,007 | B2* | 5/2020 | Cordoba | B25J 13/02 |
| 10,654,173 | B2* | 5/2020 | Fujikawa | G01L 5/167 |

(Continued)

FOREIGN PATENT DOCUMENTS

| CN | 201277893 | 7/2009 |
| CN | 208206368 | 12/2018 |

(Continued)

OTHER PUBLICATIONS

English Translation of JP S64-35331 (Year: 1989).*

(Continued)

*Primary Examiner* — Alexander A Mercado
(74) *Attorney, Agent, or Firm* — Burris Law, PLLC

(57) ABSTRACT

An elastic body is fixed to a main body and a movable body and is deformable according to the movement of the movable body. A strain sensor is provided on the elastic body and includes a strain body. The movable body includes an opening. The stopper member includes a first contact portion and a second contact portion provided inside the opening, whose distances from the opening are different from each other. The first contact portion is located in a direction in which the movable range of the strain body is great, and the second contact portion is located in a direction in which the movable range of the strain body is small.

8 Claims, 22 Drawing Sheets

(56) References Cited

U.S. PATENT DOCUMENTS

2018/0252604 A1* 9/2018 Kawai .................... H10N 30/85
2019/0391023 A1   12/2019 Endo et al.

FOREIGN PATENT DOCUMENTS

| JP | 564035331 | 2/1989 |
| JP | 2018048915 | 3/2018 |
| WO | 2018163580 | 9/2018 |

OTHER PUBLICATIONS

International Search Report for International Application PCT/JP2019/047066, mailed Dec. 24, 2019.
Office Action for CN Application No. 201980088040.7, issued Sep. 14, 2022, and English translation thereof, 16 pages.
Extended European Search Report for EP Application No. 19913703.5, mailed Sep. 28, 2022, 9 pages.

* cited by examiner

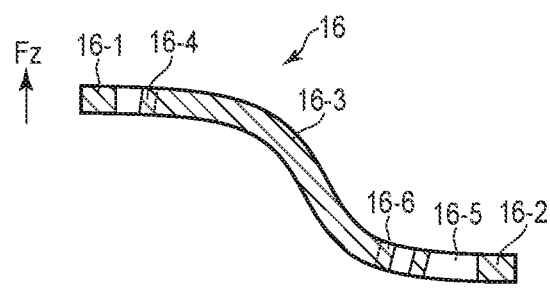
F I G. 10A
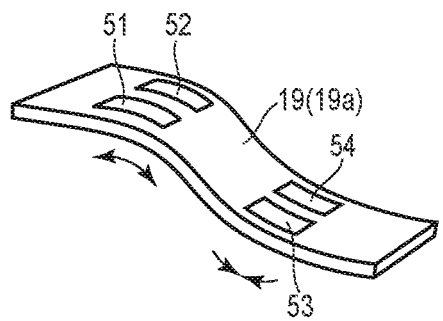
F I G. 10B
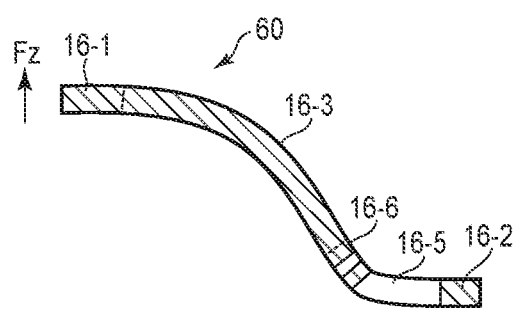
F I G. 10C

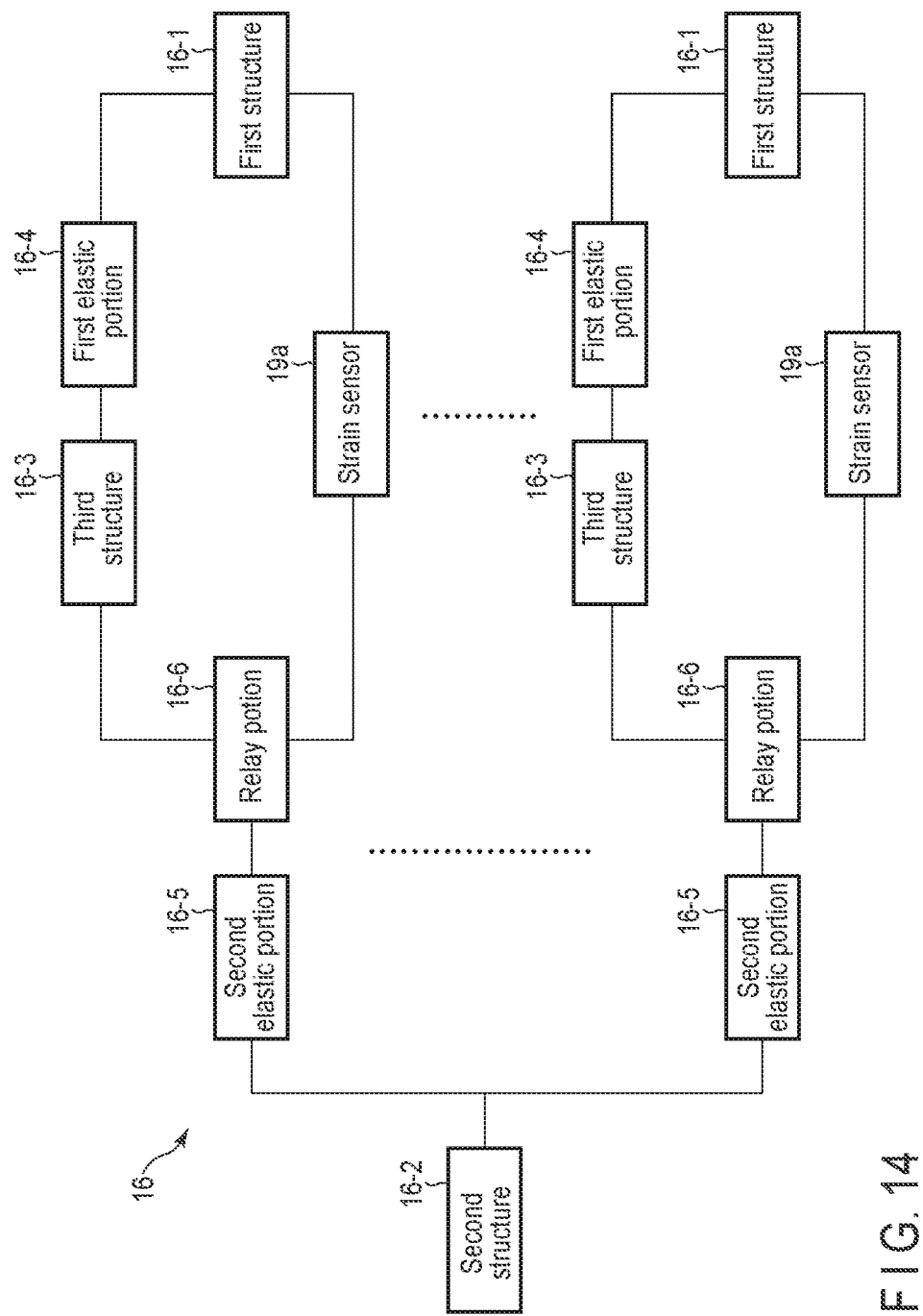
F I G. 14

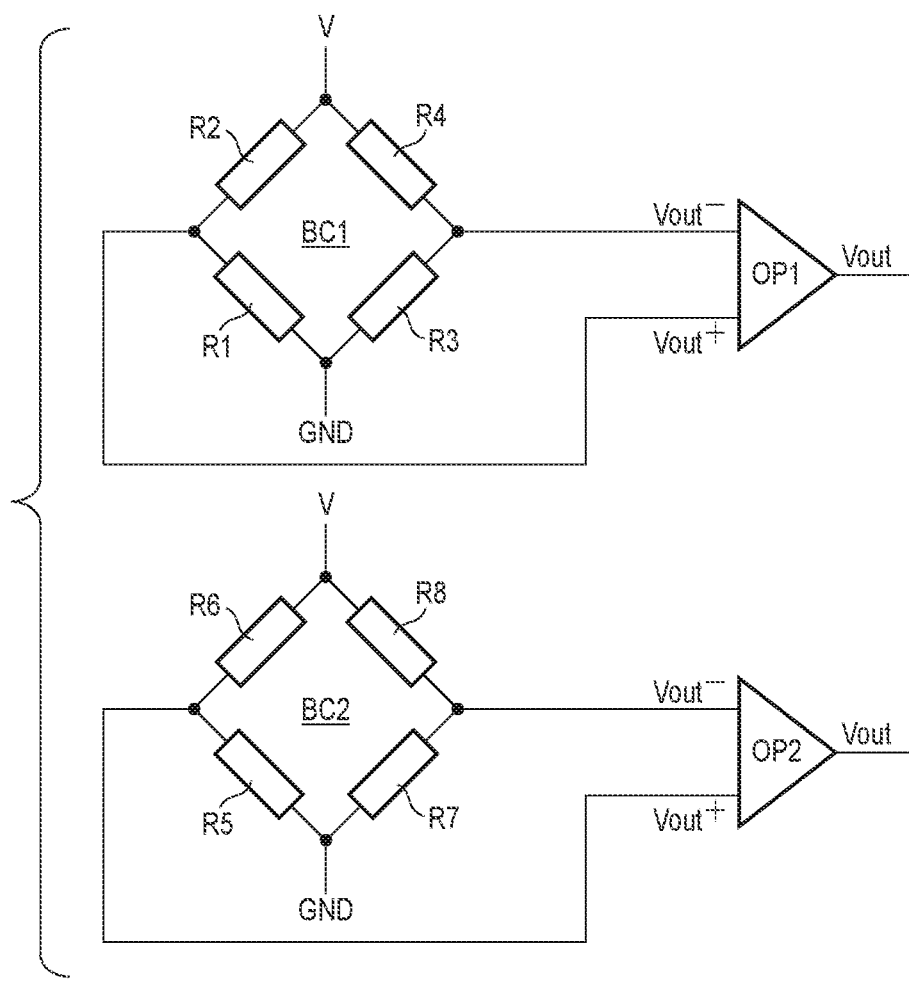
F I G. 17

|  | Fx | Fy | Fz | Mx | My | Mz |
|---|---|---|---|---|---|---|
| Amount of displacement @ rating [mm] | 0.038 | 0.038 | 0.038 | 0.091 | 0.091 | 0.037 |
| Safety factor | 6.0 | 5.5 | 7.5 | 5.0 | 4.6 | 6.7 |
| Operable range [mm] | 0.230 | 0.209 | 0.285 | 0.455 | 0.419 | 0.248 |

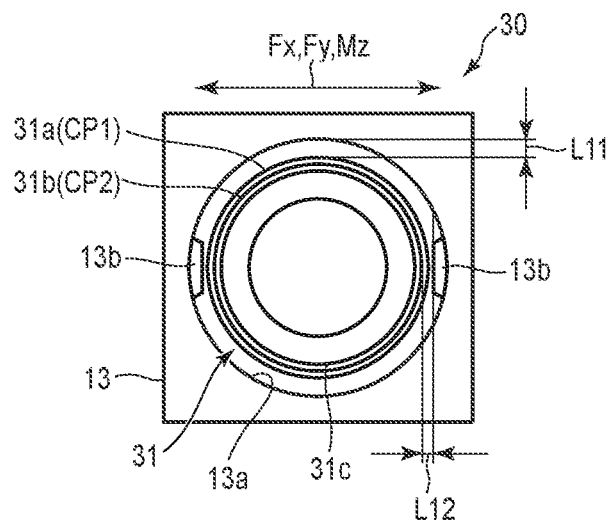
F I G. 22
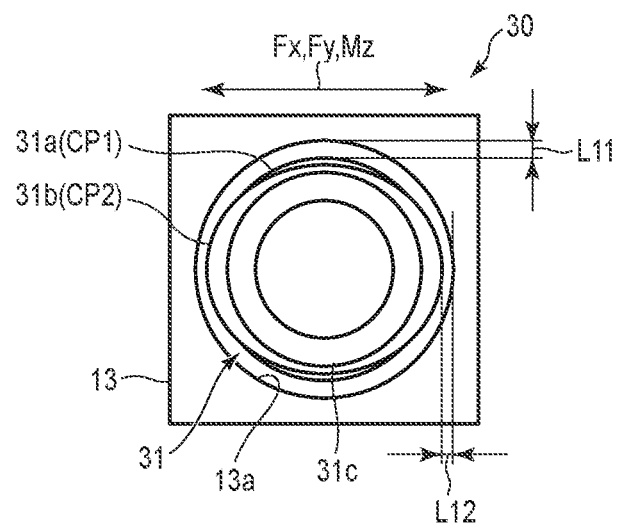
F I G. 23

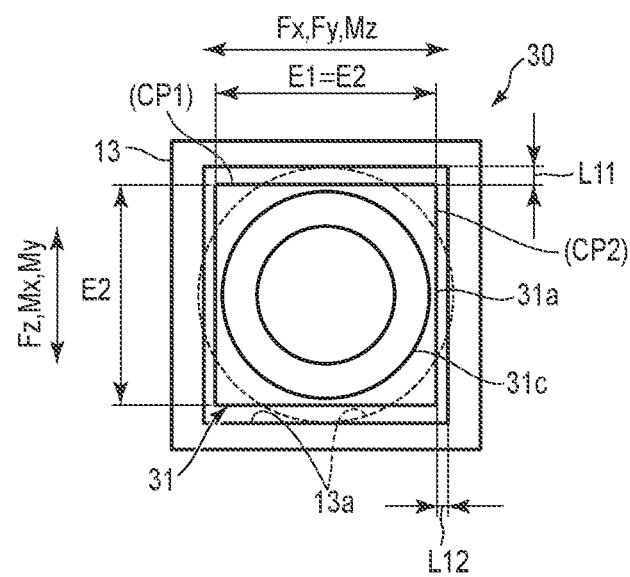
F I G. 29
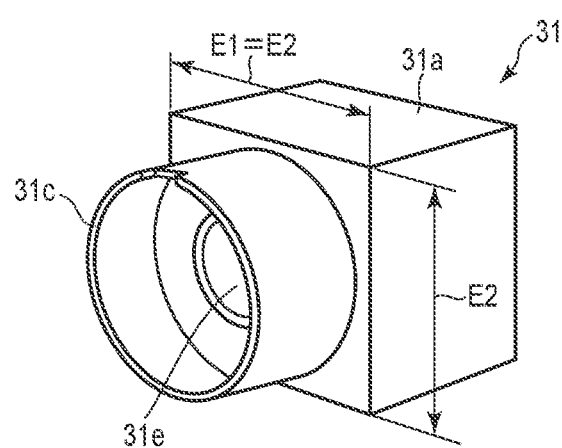
F I G. 30

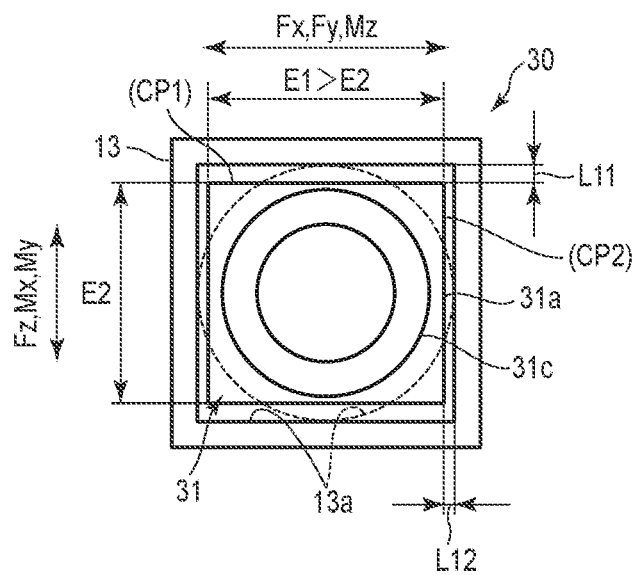
F I G. 31

FORCE SENSOR

CROSS-REFERENCE TO RELATED APPLICATIONS

This application is a continuation application of PCT Application No. PCT/JP2019/047066, filed Dec. 2, 2019 and based upon and claiming the benefit of priority from prior Japanese Patent Application No. 2019-012323, filed Jan. 28, 2019, the entire contents of all of which are incorporated herein by reference.

FIELD

Embodiments of the present disclosure relate to an elastic body used for, for example, robot arms and the like, and a force sensor using the same.

BACKGROUND

Force sensors are used, for example, by robot arms and the like, and they detect a force (Fx, Fy, Fz) and a moment (Mx, My, Mz) with respect to three axes (x, y and z) orthogonal to each other. The force sensors comprise a stopper to prevent the strain sensor from being destroyed by excessive force or moment (see, for example, JP 2018-48915 A).

SUMMARY

The stopper includes, for example, a cylindrical stopper member and the stopper member is provided within a circular opening provided in a movable body of the force sensor. A slight gap is provided between the outer surface of the stopper member and the inner surface of the opening.

Inside the force sensor, an elastic body fixed to the main body and the movable body is provided and, for example, a strain body which constitutes a strain sensor is provided on the elastic body (hereinafter, the elastic body and the strain body are referred to together as the sensor body). When the rigidity of the sensor body is different in each axial direction, it is difficult to protect the strain sensor for all directions with a stopper consisting of a cylindrical stopper member and a circular opening.

Embodiments of the present disclosure provide a force sensor including a stopper which can reliably protect the strain sensor.

According to one embodiment, a force sensor comprising a main body, a movable body movable with respect to the main body, an elastic body fixed to the main body and the movable body and deformable according to movement of the movable body, a strain sensor provided on the elastic body and including a strain body, an opening formed in the movable body, a stopper member provided inside the opening, including a first contact portion and a second contact portion, distances of which from the opening are different from each other, and a fixing member for fixing the stopper member to the main body, wherein the first contact portion is located in a direction in which the movable range of the strain body is great, and the second contact portion is located in a direction in which the movable range of the strain body is less.

Additional objects and advantages of the disclosure will be set forth in the description which follows, and in part will be obvious from the description, or may be learned by practice of the disclosure. The objects and advantages of the disclosure may be realized and obtained by means of the instrumentalities and combinations particularly pointed out hereinafter.

DRAWINGS

The accompanying drawings, which are incorporated in and constitute a part of the specification, illustrate embodiments of the disclosure, and together with the general description given above and the detailed description of the embodiments given below, serve to explain the principles of the disclosure.

FIG. 10A is a partial lateral cross-sectional view showing an example of deformation of the elastic body according to this embodiment.

FIG. 10B is a perspective diagram showing an example of deformation of the strain body caused by the deformation shown in FIG. 10A.

FIG. 10C is a partial plan view showing an example of deformation of the elastic body as a reference example.

FIG. 14 is a schematic diagram showing the fourth modified example of the elastic body.

FIG. 17 is a circuit diagram showing an example of a bridge circuit.

FIG. 22 is a front view showing the first modified example of the stopper.

FIG. 23 is a front view showing the second modified example of the stopper.

FIG. 29 is a front view showing the eighth modified example of the stopper.

FIG. 30 is a partial perspective view showing a part of the illustration of FIG. 29.

FIG. 31 is a front view showing the ninth modified example of the stopper.

DETAILED DESCRIPTION

Figure 1:
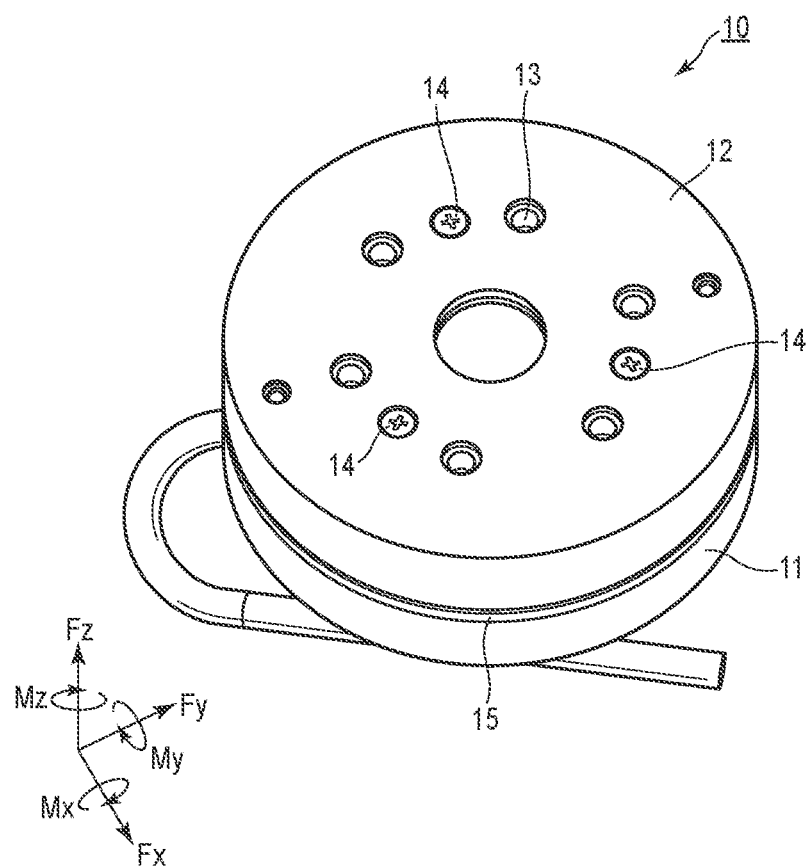
FIG. 1 is a perspective diagram showing a force sensor according to an embodiment.

Hereinafter, the present embodiments will be described with reference to the drawings. In the drawings, the same members are denoted by the same reference symbols.

With reference to FIGS. 1 to 6, the configuration of a force sensor 10 according to an embodiment will be described.

The force sensor 10 is used, for example, in a robot arm or the like and detects the force (Fx, Fy, Fz) in X, Y and Z-axes directions and a torque (moment: Mx, My, Mz) around X, Y and Z axes.

Figure 2:
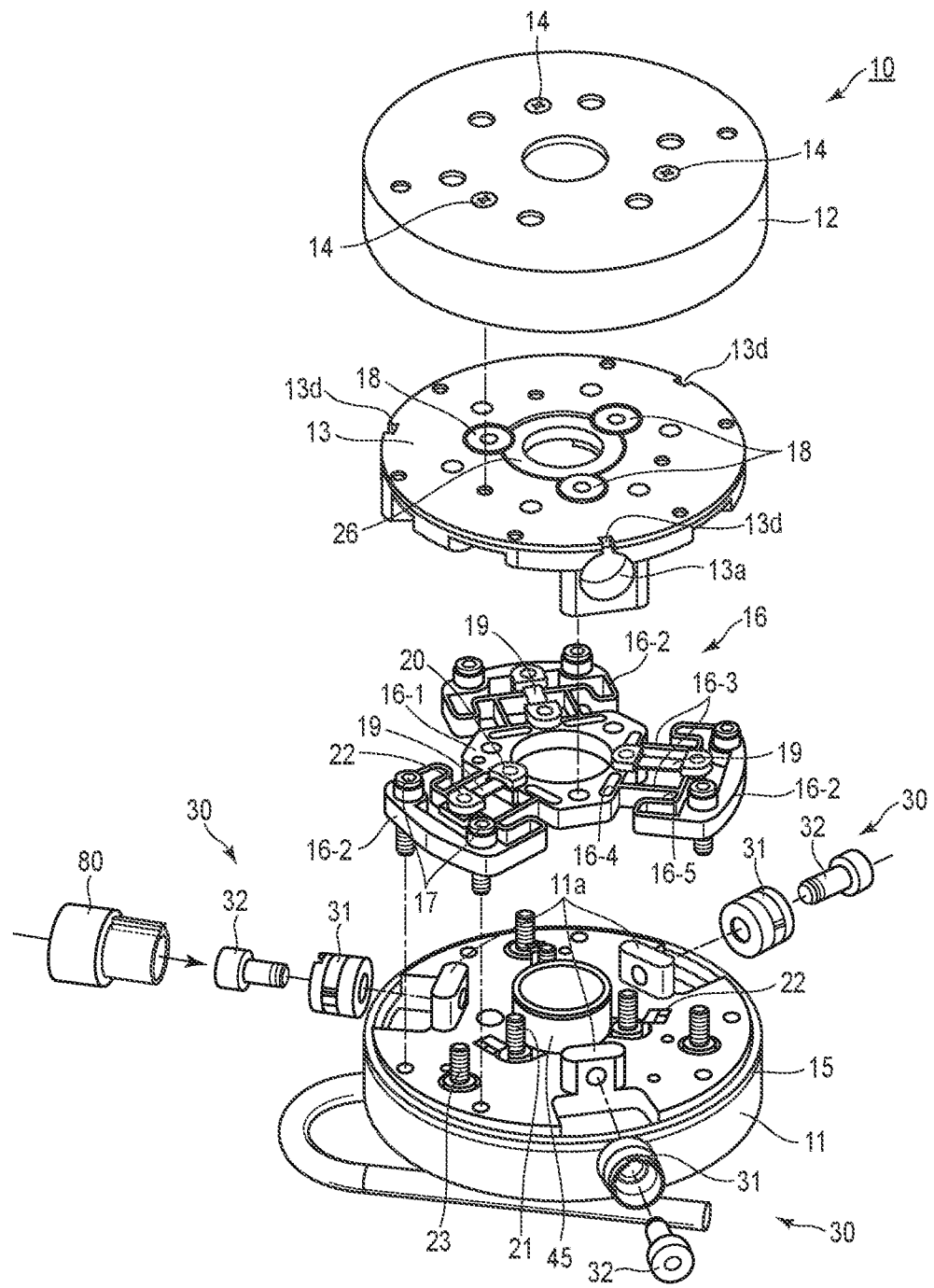
FIG. 2 is a decomposed perspective diagram showing the force sensor shown in FIG. 1.

As shown in FIGS. 1 and 2, the force sensor 10 comprises a cylindrical main body 11 and a cylindrical cover 12 covering the main body 11. In the cover 12, a mounting plate 13 is provided as a movable body operable on the main body 11, and the mounting plate 13 is fixed to the cover 12 by a plurality of screws 14. The cover 12 and the mounting plate 13 are provided to be operable on the main body 11.

The main body 11 is fixed to, for example, a main portion of the robot arm (not shown). The mounting plate 13 is fixed to, for example, a hand portion of the robot arm.

Between the main body 11 and cover 12, a ring-shaped sealing member 15 is provided. The sealing member 15 is formed of an elastic member, for example, a rubber or a foaming member, and seals the gap between the main body 11 and the cover 12 so as for the cover 12 to be operable on the main body 11.

Between the main body 11 and the mounting plate 13, an elastic body 16 is provided. The elastic body 16 is made of, for example, metal, and as will be described later, comprises one first structure 16-1, a plurality of second structures 16-2, a plurality of third structures 16-3 provided between the first structure 16-1 and the second structures 16-2, and the like. The second structures 16-2 are arranged around the first structure 16-1 at equal intervals.

In this embodiment, the elastic body 16 comprises, for example, three second structures 16-2. But, the number of second structures 16-2 is not limited to three, but may be three or more. When this embodiment is applied to some other device than the force sensor, for example, a torque sensor, the number of second structures 16-2 may be two.

Figure 3:
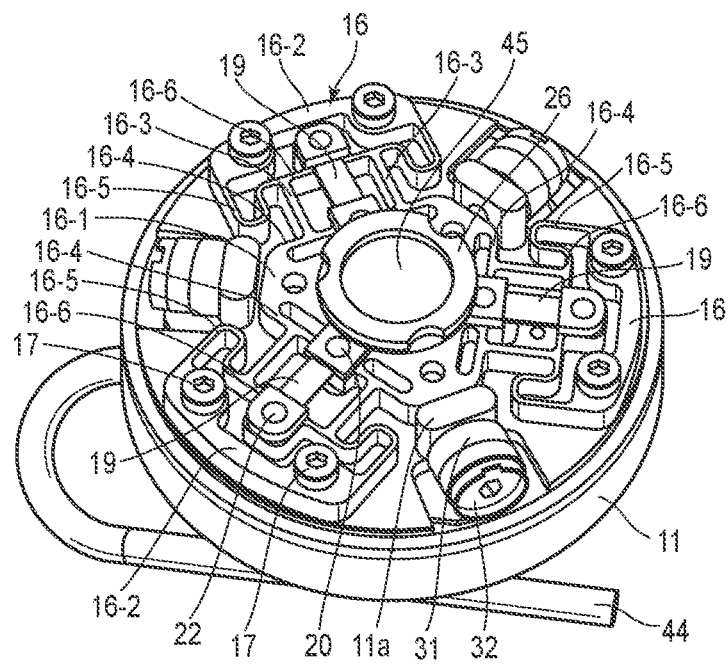
FIG. 3 is a perspective view showing the force sensor shown in FIG. 2 when partially assembled.

As shown in FIG. 3, the first structure 16-1 comprises six first elastic portions 16-4 therearound. The first elastic portions 16-4 are disposed around the first structure 16-1 and are each formed into a linear shape.

Each of the second structures 16-2 comprises two substantially U-shaped second elastic portions 16-5 and a relay portion 16-6 provided between the two second elastic portions 16-5 and on a straight line connecting these two second elastic portions 16-5 together.

Each of the third structures 16-3 is connected, by one end, to the first elastic portion 16-4 and is connected, by the other end, to the respective relay portion 16-6. Two third structures 16-3 provided between the first structure 16-1 and one second structures 16-2 are placed parallel to each other.

Figure 4:
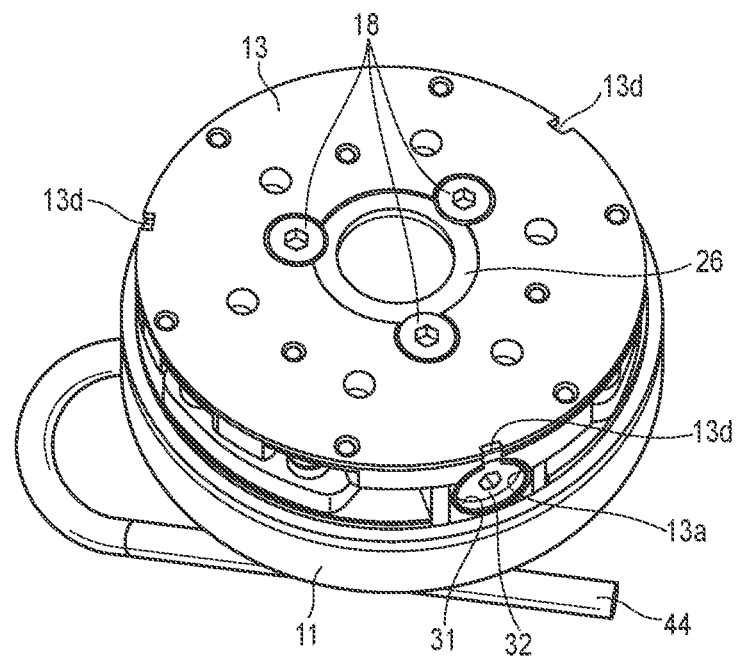
FIG. 4 is a perspective view showing the force sensor shown in FIG. 2 when further assembled.

The second structures 16-2 are fixed to the main body 11 by a plurality of screws 17, and the first structure 16-1 is fixed to the mounting plate 13 by a plurality of screws 18 as shown in FIGS. 2 and 4.

As shown in FIGS. 2 and 3, a strain sensor 19 is provided between the first structure 16-1 and each relay portion 16-6. More specifically, one end portion of the strain sensor 19 is fixed to the first structure 16-1 located between respective two first elastic portions 16-4 by a fixing plate 20 and a screw 21 inserted to a rear surface of the first elastic portion 16-4, and the other end of the strain sensor 19 is fixed to a central portion of the respective relay portion 16-6 by a fixing plate 22 and a screw 23 inserted to a rear surface of the relay portion 16-6. As will be described later, the strain sensor 19 comprises a metal-made strain body and a plurality of strain gauges disposed on a front surface of the strain body.

When the mounting plate 13 and the cover 12 operate on the main body 11 by an external force, the third structures 16-3, the first elastic portions 16-4, the second elastic portions 16-5 and the relay portions 16-6 are deformed. Accordingly, the strain bodies of strain sensors 19 are deformed, thus outputting electric signals from the respective strain gauges.

The strain gauges of the strain sensors 19 construct a bridge circuit, as will be described below, which detects the force (Fx, Fy, Fz) in the X, Y and Z-axes directions and the torque (moment: Mx, My, Mz) around the X, Y and Z-axes.

As shown in FIG. 2, the main body 11 is provided with a plurality of stoppers 30 which protect the elastic bodies 16 from an external force. Each stopper 30 comprises a cylindrical stopper member 31, a screw 32 as a fixing member and a plurality of openings 13a formed in the mounting plate 13.

This embodiment illustrates the case which comprises three stoppers 30. But, the number of stoppers 30 is not limited to three and may be three or more. The three stoppers 30 are each placed between respective adjacent structural bodies 16-2 of the three second structures 16-2.

With the configuration that each stopper 30 is disposed between each adjacent pair of second structures 16-2, it is possible to inhibit the diameter and outer dimensions of the elastic bodies 16 and the force sensor as a whole structure from increasing.

A plurality of projections 11a are provided on the surface of the main body 11. Each of the projections 11a is located between each adjacent pair of second structures 16-2.

As shown in FIG. 4, each stopper member 31 is fixed to the respective projection 11a of the main body 11 while being inserted in the respective opening 13a of the mounting plate 13 by the respective screw 32. The outer diameter of the stopper member 31 is set slightly less than the inner diameter of the opening 13a as will be described below. When the mounting plate 13 operates on the main body 11 so as to make the outer surface of the stopper member 31 abut on the inner surface of the opening 13a, the operation of the mounting plate 13 is stopped, thereby making it possible to prevent the elastic bodies 16 and the strain bodies of the strain sensors 19 from being damaged.

Figure 5:
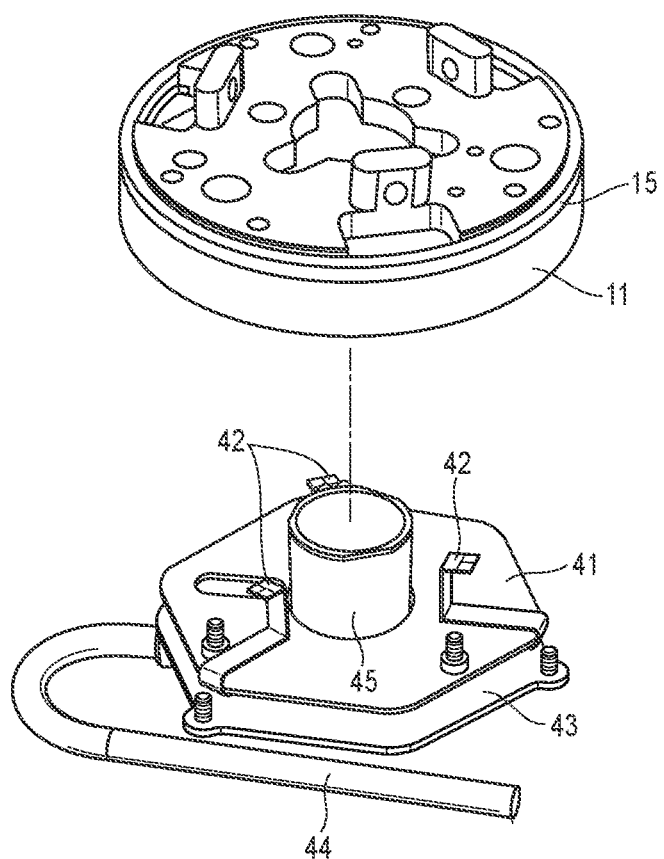
FIG. 5 is a further decomposed perspective diagram showing the force sensor shown in FIG. 2.

As shown in FIG. 5, in a rear surface portion of the main body 11, a printed board 41, a plurality of flexible printed boards 42, a rear cover 43, a lead wire assembly 44 and a hollow tube 45 are provided. The printed board 41 comprises processing circuits (not shown) and the like, which supply power to a bridge circuit and process an output signal of the bridge circuit.

As shown in FIG. 2, end portions of one side of the flexible printed boards 42 are disposed on an upper surface side of the main body 11, and connected the strain sensors 19, respectively. End portions of the other side of the flexible printed boards 42 are connected to the processing circuits and the like in the rear surface of the printed board 41. The flexible printed boards 42 supply power to the strain gauges and supply signals from the strain gauges to the processing circuits.

The lead wire assembly 44 is connected to the printed board 41 to supply power to the processing circuits and transmit signals from the processing circuits. The rear cover 43 is fixed to the main body 11 by a plurality of screws and covers the printed board 41.

An opening is made in the main body 11, the cover 12, the mounting plate 13, the first structure 16-1 of the elastic bodies 16, the printed board 41 and the central portion of the rear cover 43, so as to communicate therethrough, and the hollow tube 45 is provided in the opening.

As shown in FIGS. 2 and 3, one end portion of the hollow tube 45 penetrates the rear cover 43, the printed board 41 and the first structure 16-1, and projects from the surface of the first structure 16-1. A ring-like sealing member 26 is provided around the one end portion of the hollow tube 45, which projects from the surface of the first structure 16-1. The sealing member 26 is formed of, for example, a rubber or foam material, and it seals the gap between the opening of the mounting plate 13 and the one end portion of the hollow tube 25. Thus, it is possible to prevent the entering of dust to the inner side of the mounting plate 13 from the outside of the cover 12.

(Configuration of Elastic Bodies)

Figure 6:
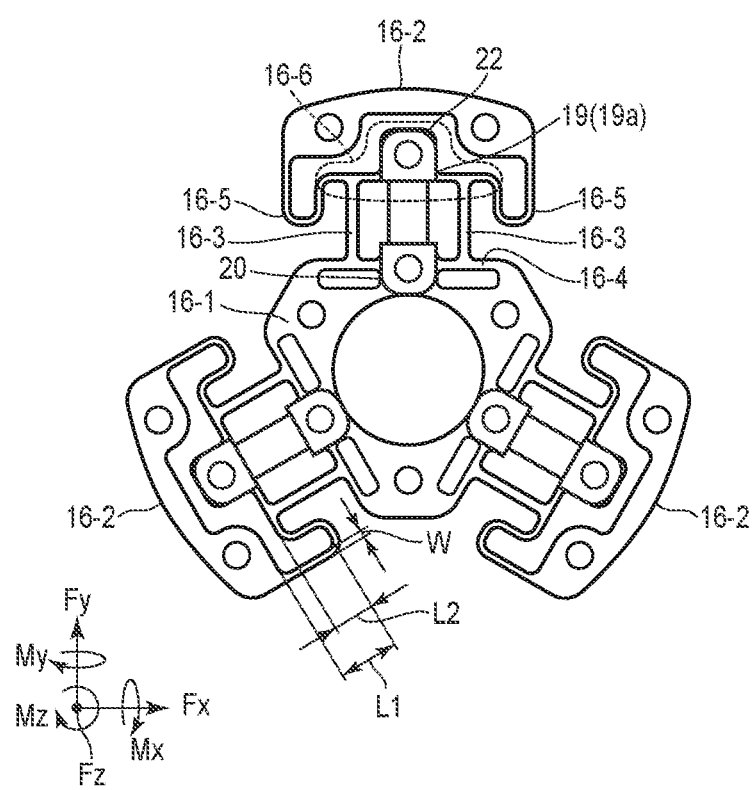
FIG. 6 is a plan view showing an elastic body according to this embodiment when taken out.

FIG. 6 shows the elastic body 16 and the strain sensor 19. As described above, the elastic body 16 comprises one first structure 16-1, three second structures 16-2, a plurality of third structures 16-3, six first elastic portions 16-4 provided in the first structure 16-1, two second elastic portions 16-5 provided in each of the three second structures 16-2 and a relay portion 16-6 provided between each pair of the two second elastic portions 16-5.

The second elastic portions 16-5 each are formed into a U-shape, and have a flexural or torsional rigidity lower than that of the second structures 16-2. The first elastic portions 16-4 have a torsional rigidity equivalent to or lower than that of the second elastic portions 16-5.

Each strain sensor 19 is provided between the first structure 16-1 located between the two respective first elastic portions 16-4 and the central portion of the respective relay portion 16-6. Further, each strain sensor 19 is located between the two respective third structures 16-3 so as to be parallel to the two third structures 16-3.

A thickness of each first elastic portion 16-4, each second elastic portion 16-5 and each relay portion 16-6 is equal to a thickness of the first structure 16-1, the second structures 16-2 and the third structures 16-3, and a width W of the first elastic portions 16-4, the second elastic portions 16-5 and the relay portions 16-6 is equal to a width of the third structures 16-3. As lengths L1 and L2 of the U-shaped portion are longer and the width W of the U-shaped portion is more slender, the second elastic portions 16-5 are more flexible. Further, as their widths are less, the first elastic portions 16-4 and the relay portions 16-6 are more flexible.

A thickness of a strain body 19a which constitutes the strain sensor 19 is less than those of the first structure 16-1, the second structures 16-2, the third structures 16-3, the first elastic portions 16-4, the second elastic portions 16-5 and the relay portions 16-6, and a width of the strain body 19a is greater than those of the third structures 16-3, the first elastic portions 16-4, the second elastic portions 16-5 and the relay portions 16-6. But the thicknesses and dimensions in width and their relationships in terms of size of the first elastic portions 16-4, the second elastic portions 16-5, the relay portions 16-6 and the third structures 16-3, can be changed as necessary.

The strain body 19a is thin rectangular as will be described later, and has a shape which has a large aspect ratio in its plane. Therefore, when the strain body 19a is a single unit, the strain body 19a has characteristics that its displacement is less with respect to the force in the Fx and Fy directions and the moment in the Mz direction, and its displacement is great with respect to the moment in the Mx and My directions and the force in the direction Fz due to the difference in moment of inertia of area.

On the other hand, when the amount of displacement of the elastic body 16 is excessively small, the structure of the stopper 30 is required to be processed at high accuracy. When the amount of displacement with respect to the force in the Fx and Fy directions and the moment in the Mz direction and the amount of displacement with respect to the moment in the Mx and My directions and the force in the Fz direction are large, the structure of the stopper 30 is complicated. Therefore, in order to constitute a high-precision force sensor of a simple structure, it is necessary that the difference in amount of displacement among the axes of the elastic body 16 should be small.

As to the elastic body 16 according to the present embodiment, the amount of displacement can be increased in a direction parallel to the X-Y plane (a plane containing the X-axis and Y-axis), and therefore even though the strain body 19a is only slightly displaced, it is possible to realize a large amount of displacement as a sensor body.

Further, the rigidity of the strain body 19a in the Z-axis direction is far less than the rigidity of the elastic body 16 in the Z-axis direction. Therefore, the rated load regarding the bending of the force sensor in the Z-axis direction cannot be applied to the single unit strain body 19a. Consequently, it is necessary to control the amount of displacement of the strain body 19a.

Therefore, the function required from the elastic body 16 is: (1) to have a large amount of displacement in the X-Y plane; and (2) to control the amount of displacement of the strain body 19a in reception of the load in the Z-axis direction.

Figure 7:
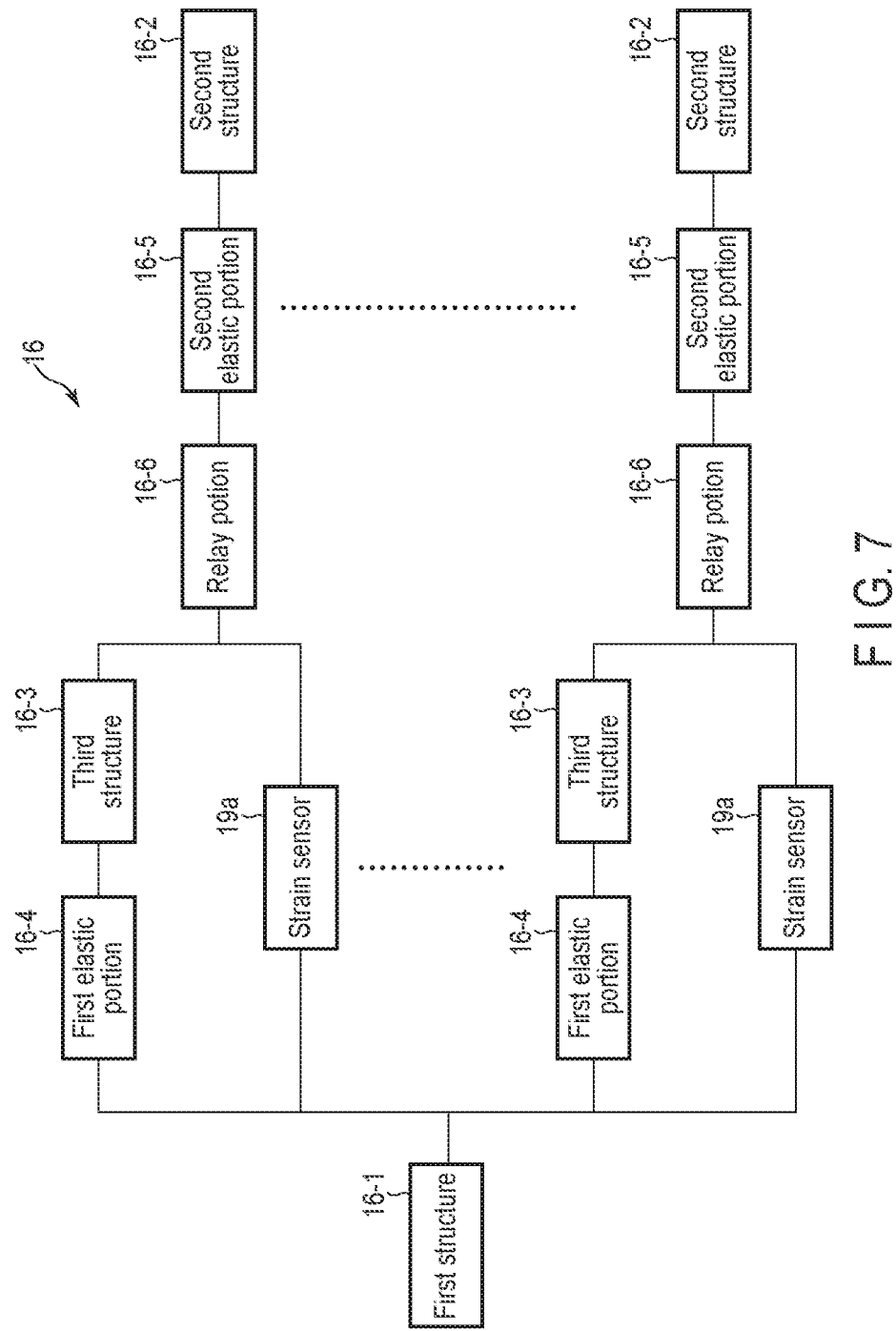
FIG. 7 is a schematic representation of the elastic body of this embodiment.

FIG. 7 schematically shows the structure of the elastic body 16 according to the embodiment provided above.

The first structure 16-1 and the relay portion 16-6 are connected to each other by the first elastic portions 16-4 and the third structures 16-3 connected in series, and further connected by the strain body 19a.

The relay portion 16-6 and the second structure 16-2 are connected by the second elastic portions 16-5 provided therebetween.

Here, the first elastic portions 16-4 and the second elastic portions 16-5 have a function to increase the amount of displacement of the elastic body 16 with respect to the force in the Fx and Fy directions and the moment in the Mz direction, which will now be described more specifically.
(Function of the First Elastic Portion 16-4)
(1) Deformation of the Mz System (Fx, Fy, Mz)

Figure 8:
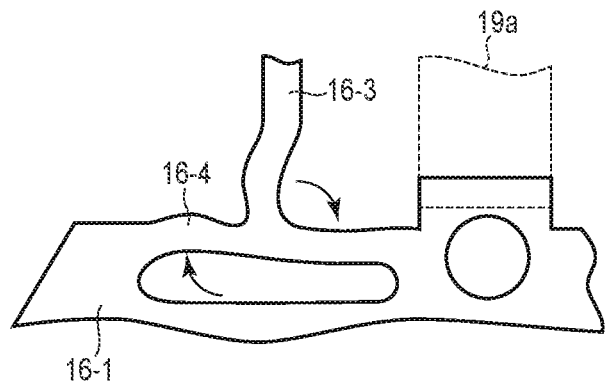
FIG. 8 is a partial plan view showing an example of the elastic body shown in FIG. 6 when deformed.

As shown in FIG. 8, when a force in the Fx and Fy directions is applied to the elastic body 16 and when a moment in the Mz direction is applied, the portion of the first elastic portion 16-4, to which the respective third structure is connected, is deformed as indicated by an arrow. Thus, the amount of displacement of the second structures 16-2 with respect to the first structure 16-1 is increased. The strain body 19a is displaced as much depending on the width of the third structure 16-3, the width of strain body 19a and the load, and here the amount of displacement of the strain body 19a is slight. That is, in the case of this embodiment, the amount of displacement of the second structure 16-2 with respect to the first structure 16-1 can be increased as compared to the amount of displacement of the strain body 19a.

(2) Deformation of the Fz System (Mx, My, Fz)

Figure 9:
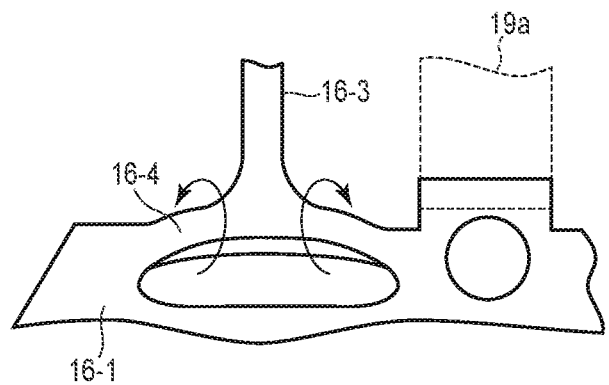
FIG. 9 is a partial plan view showing another example of the elastic body shown in FIG. 6 when deformed.

As shown in FIG. 9, when a force in the Fz direction is applied to the elastic body 16 and when the moment in the Mx and My direction is applied, the portion of the first elastic portion 16-4, to which the third structure 16-3 is connected, is deformed as indicated an arrow. Thus, the amount of displacement of the third structure 16-3 in the thickness direction can be increased, and therefore the amount of displacement of the strain body 19a in the thickness direction can be increased. Consequently, the third structure 16-3 can be deformed into an approximately S-shape and the output voltage of the bridge circuit can be increased as will be described later.

FIG. 10A shows an example of deformation of the elastic body 16 according to this embodiment.

The first structure 16-1 includes the first elastic portion 16-4 which has a torsional rigidity equivalent to or less than that of the second elastic portion 16-5. Therefore, when a force in, for example, the Fz direction is applied to the elastic body 16, the first elastic portion 16-4 is deformed, thus deforming the second elastic portion 16-5, and therefore the amount of lifting of the relay portion 16-6 is decreased. Thus, the third structure 16-3 is deformed into an approximately S-shape, and the strain body 19a provided between the first structure 16-1 and the relay portion 16-6 is deformed into an approximately S-shape.

FIG. 10B schematically shows deformation of the strain body 19a caused by the deformation of the elastic body 16 shown in FIG. 10A. On the surface of the strain body 19a, a plurality of strain gauges 51 to 54 are disposed as illustrated.

When the strain body 19a is deformed into an approximately S-shape by the deformation of the elastic body 16, the strain gauges 51 and 52 provided on the surface of the strain body 19a are elongated, and the strain gauges 53 and 54 are compressed. As a result, the differences between the resistance value of the strain gauges 51 and 52 and the resistance value of the strain gauges 53 and 54 is increased, thus making it possible to increase the output voltage of the bridge circuit constituted by the strain gauges 51 to 54. Therefore, the accuracy of the force sensor can be improved.

FIG. 10C shows a state of deformation of the elastic body 60 as a comparative example. This elastic body 60 is similar to the elastic body 16 of this embodiment, without the first elastic portion 16-4. Without the first elastic portion 16-4, when the force in, for example, the Fz direction is applied to the elastic body 60, the second elastic portion 16-5, which has a rigidity lower than that of the second structure 16-2, is bent or twisted by deformation, and thus the third structure 16-3 is curved. Consequently, the relay portion 16-6 is lifted. Accordingly, the strain body 19a provided between the first structure 16-1 and the relay portion 16-6 is also curved.

Figure 10D:
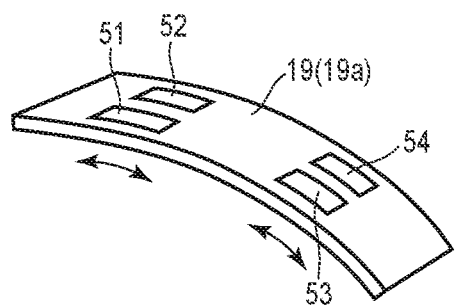
FIG. 10D is a perspective diagram showing an example of deformation of the strain body caused by the deformation shown in FIG. 10C.

FIG. 10D shows deformation of the strain body 19a caused by the deformation of the elastic body 60 shown in FIG. 10C. When the strain body 19a is curved by the curving of the elastic body 60, the strain gauges 51 and 52 and the strain gauges 53 and 54 provided on the surface of the strain body 19a are all elongated. Therefore, the difference between the resistance value of the strain gauges 51 and 52 and the resistance value of the strain gauges 53 and 54 is small, and the output voltage of the bridge circuit constituted by the strain gauges 51 to 54 is also low. Therefore, it is difficult to improve the accuracy of the force sensor.
(Function of the Second ELASTIC Portion 16-5)

The second elastic portion 16-5 has a bending or torsional rigidity lower as compared to that of the second structure 16-2. Therefore, when a force in the Fx and Fy directions is applied to the elastic body 16 and the moment in the Mz direction is applied thereto, the amount of displacement of the second structure 16-2 with respect to the first structure 16-1 can be increased despite that the strain body 19a provided between the first structure 16-1 and the relay portion 16-6 is displaced only by the amount controlled by the third structure 16-3, which will be described later.

More specifically, the width of the U-shaped second elastic portion 16-5 is set narrow as compared to its thickness, thus creating a great difference in moment of inertia of area of the second elastic portion 16-5. Therefore, the second elastic portion 16-5 has high rigidity to the force in the Fz direction and low rigidity to the moment in the Mz direction. When torsion is considered, the second elastic portion 16-5 has a flexibility equivalent to or higher than that assumed for simple bending to the force in the Fz direction. However, the second elastic portion 16-5 has a rigidity sufficient to the force in the Fz direction as compared to the moment in the Mz direction.
(Function of the Third Structure 16-3)

The third structure 16-3 is provided between the first elastic portion 16-4 and the relay portion 16-6 and disposed parallel to the strain sensor 19. For this reason, when the force in the Fx and Fy directions and/or the moment in the Mz direction are applied to the elastic body 16, the amount of displacement of the strain body 19a, which constitutes the strain sensor 19 in the thickness direction and the width direction, can be controlled.

More specifically, the thickness of the third structures 16-3 is greater than the thickness of strain body 19a, and the width of the third structure 16-3 is less than the width of the strain body 19a. Thus, with the third structure 16-3, the amount of displacement of the strain body 19a having a different moment of inertia of area in the thickness direction and the width direction can be controlled.
(Effect of the Elastic Body 16 and the Force Sensor)

The elastic body 16 of this embodiment comprises the first structure 16-1, a plurality of second structures 16-2, a plurality of first elastic portions 16-4 provided on the first structure 16-1, second elastic portions 16-5 provided respectively in the second structures 16-2, a relay portion 16-6 provided between two second elastic portions 16-5 and third structures 16-3 provided between the relay portion 16-6 and the first elastic portions 16-4, and the rigidity of the second elastic portions 16-5 is lower than the rigidity of the second structures 16-2 and the rigidity of the first elastic portions 16-4 is less than or equal to the rigidity of the first structure 6-1. With this structure, the rigidity of the entire elastic body 16 can be made lower as compared to that of the case where there are no first elastic portions 16-4 and second elastic portions 16-5, the amount of displacement of the elastic body 16 to the force in the Fx and Fy directions, can be increased. Therefore, the amount of displacement of the elastic body 16 to the force in the Fx and Fy directions can be increased as compared to the slight deformation of the strain body 19a.

Further, the elastic body 16 of this embodiment comprises the first elastic portions 16-4, the second elastic portions 16-5 and the relay portions 16-6, and thus it can substantially equalize the amounts of displacement in the six axial directions. Moreover, as the force in the Fz direction is received, the deformation of the third structures 16-3 and the relay portions 16-6 can be inhibited, and the first elastic portions 16-4, the third structures 16-3 and the relay portions 16-6 can be deformed into an approximately S-shape. Accordingly, the strain body 19a can be deformed into an S-shape, and therefore sufficient distortion can be imparted to the strain body 19a to the force in the Fz direction. Therefore, a high sensor output can be obtained, and a high-precision force sensor can be constructed.

Further, when the rigidity of the first elastic portions 16-4 is less than or equal to the rigidity of the second elastic portions 16-5, large distortion can be imparted to the strain body 19a to the force in the Fz direction, and thus a further higher sensor output can be obtained. Note that, here the rigidity includes the axial rigidity, flexural rigidity, shearing rigidity and torsional rigidity.

Moreover, the elastic body 16 exhibits amounts of displacement in the six axial directions approximately equal to each other, and has a low rigidity as a whole. Therefore, with the stopper 30 of such a simple structure, the strain body 19a can be protected.

More specifically, in the case of a high-rigidity elastic body, the gap between the side surface of the stopper member 31 of the stopper 30 and the inner surface of the opening 13a of the mounting plate 13 needs to be set to, for example, 20 μm. Thus, it is difficult to process the device mechanically. However, when the rigidity of the entire elastic body 16 is low as in the present embodiment, the amount of displacement of the elastic body 16 at the rated load can be increased to, for example, 100 μm to 200 μm. Thus, the gap between the side surface of the stopper member 31 and the inner surface of the opening 13a of the mounting plate 13 can be widened, thereby making it easy to design the stopper 30 at the time of overloading and to process the stopper 30 mechanically.

Furthermore, at the time of overload, the displacement of the elastic body 16 and the strain body 19a can be inhibited by the high-rigidity stopper 30, and therefore sufficient distortion can be imparted to the strain body 19a in a range of the rated load. Thus, a high sensor output can be obtained. When there is no stopper 30, it is necessary to set a rated load with which sufficient safety can be expected on the assumption of even the overloading. With this structure, sufficient distortion cannot be imparted to the strain body, and accordingly it is difficult to extract high sensor output.

Modified Examples of the Elastic Body 16

First Modified Example

Figure 11:
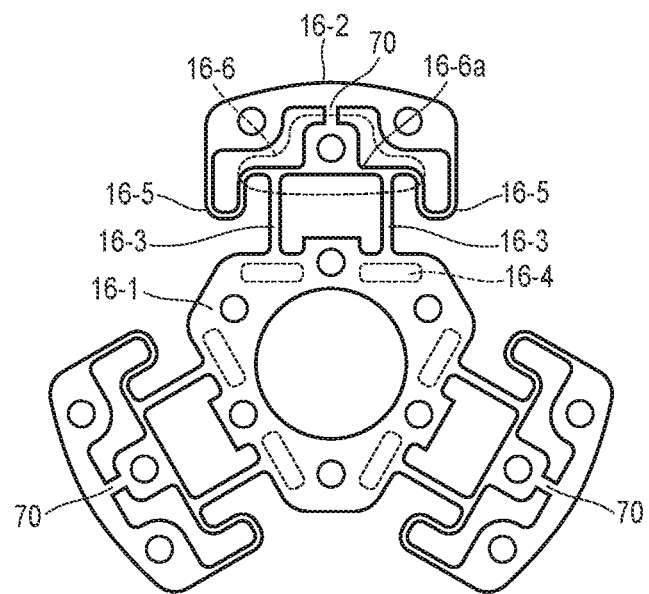
FIG. 11 is a plan view showing the first modified example of the elastic body.

FIG. 11 shows the first modified example of the elastic body 16. The elastic body 16 shown in FIG. 6 is different from the elastic body 16 shown in FIG. 11 in that the relay portion 16-6 is fixed to the respective second structure 16-2. That is, between the relay portion 16-6 and the respective second structure 16-2, a connection section 70 is provided, and the relay portion 16-6 is fixed to the second structure 16-2 by the connection portion 70.

The thickness of the connection portion 70 is equal to that of the second structure 6-2 and the relay portion 16-6, and the width thereof is equal to the width of, for example, the third structure 16-3.

Further, in this case, the first elastic portion 16-4 of the first structure 16-1 is excluded.

With the above-described structure, in the case where the torsional rigidity of a beam 16-6a of the relay portion 16-6 shown in FIG. 11 is low as compared to the flexural-rigidity of the connection portion 70 and there is no first elastic portion 16-4 of the first structure 16-1, when the third structure 16-3 is displaced by the force in the Fz direction, the surface of the relay portion 16-6 is held in an almost parallel position, although the height differs from the surface of the first structure 16-1 due to the connection portion 70. Therefore, the strain body 19a can be deformed into an S-shape as shown in FIG. 10B, making it possible to increase the output voltage of the bridge circuit.

Second Modified Example

Figure 12:
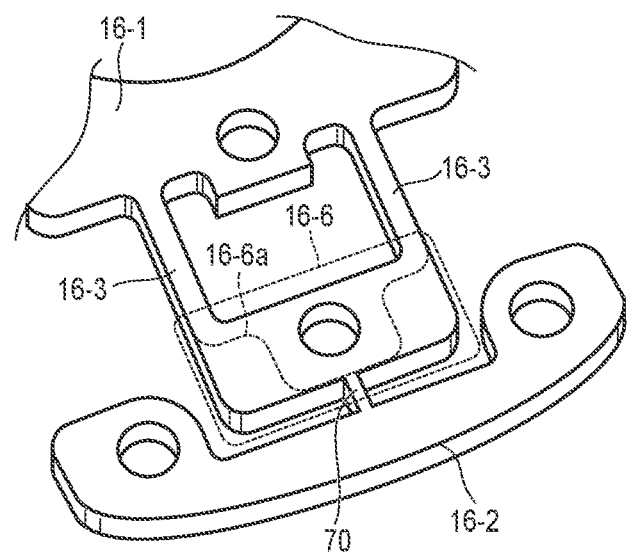
FIG. 12 is a partial perspective diagram showing the second modified example of the elastic body.

FIG. 12 shows the second modified example of the elastic body 16. The elastic body 16 shown in FIG. 12 is different from the elastic body 16 shown in FIG. 11 in that the second elastic portion 16-5 is removed from the elastic body 16 shown in FIG. 12. Further, the beam 16-6a of the relay portion 16-6 may be removed.

With this structure, when the third structure 16-3 is displaced by the force in the Fz direction, the relay portion 16-6 is held in an almost parallel position, although height differs from that of the first structure 16-1 by the connection portion 70. Therefore, with the second modified example as well, an advantage similar to that of the first modified example can be obtained.

Third Modified Example

Figure 13:
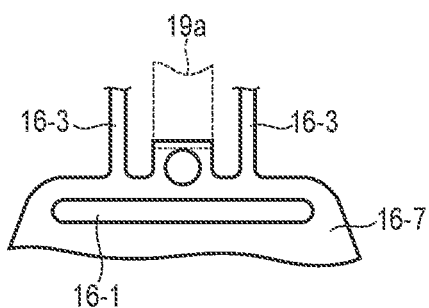
FIG. 13 is a partial plan view showing the third modified example of the elastic body.

FIG. 13 shows the third modified example of the elastic body 16. In the elastic body 16 shown in FIGS. 2, 3 and 6, the first elastic portions 16-4, on which the third structures 16-3 are respectively provided, are provided on each respective third structure 16-3.

In contrast, in the case of the third modified example shown in FIG. 13, one first elastic portion 16-7 is provided for two third structures 16-3. One end portion of the strain body 19a is provided in the respective first elastic portion 16-7 located between the two third structures 16-3.

With the above-described structure as well, the third structures 16-3 are displaced by the force in the Fz direction, the strain body 19a can be deformed into an S-shape as shown in FIG. 10B, thereby making it possible to increase the output voltage of the bridge circuit.

Note that the number of the third structures provided in the first elastic portion 16-7 is not limited to two, but may be three or more.

Fourth Modified Example

FIG. 14 schematically shows the fourth modified example of the elastic body 16.

It suffices if the elastic body 16 can increase the amount of displacement of the elastic body 16 itself in the X-Y plane as compared to the amount of displacement of the strain body 19a, and control the amount of displacement of the strain body 19a when receiving the load in the Z-axis direction. Therefore, according to the embodiment, as shown in FIG. 7, in the elastic body 16, a plurality of second structures 16-2 are disposed around the first structure 16-1, the third structures 16-3 are respectively placed between the first elastic portion 16-4 of the first structure 16-1 and the relay portion 16-6 of second structure 16-2 respectively, and each strain body 19a is placed between the respective first structure 16-1 and the respective relay portion 16-6.

However, the structure is not limited to this, but as shown in FIG. 14, a plurality of first structures 16-1 may be placed around a second structure 16-2, the third structures 16-3 may be respectively placed between the relay portions 16-6 of the second structures 16-2 and the first elastic portions 16-4 of the first structures 16-1, and each strain body 19a may be placed between the respective relay portion 16-6 and the respective first structure 16-1.

With this structure as well, an advantage similar to that of this embodiment can be obtained.

Note that in this embodiment and each of the modified examples, the material and thickness of the first elastic portions 16-4 and second elastic portions 16-5 of the elastic body 16 are the same those of the third structures 16-3, but they may be formed of different materials in different thicknesses.

Fifth Modified Example

In the case of the examples shown in FIGS. 6 and 11, the elastic body 16 comprises three second structures 16-2. But, the three second structures 16-2 can be unified by changing the arrangement of the stopper 30.

Figure 15:
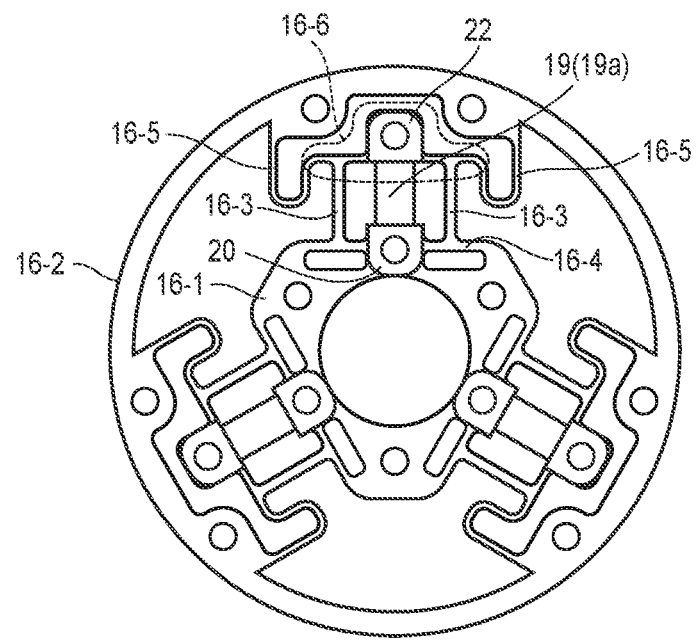
FIG. 15 is a plan view schematically showing the fifth modified example of the elastic body.

FIG. 15 shows a modified example of the elastic body 16 shown in FIG. 6. In the fifth modified example, the second structure 16-2 has a ring shape, and a plurality of second elastic portions 16-5 and relay portions 16-6 are respectively provided in a plurality of locations of one second structure 16-2. The rest of the structure is similar to that of FIG. 6. In the case of this structure, a plurality of stoppers 30 may be disposed on, for example, an outer side of the elastic body 16.

With the elastic body 16 having such a structure, an advantage similar to that of the elastic body of the structure shown in FIG. 6 can be obtained.

In the elastic body 16 shown in FIG. 11, three second structures 16-2 can be made into one ring-shaped second structure 16-2 as shown in FIG. 15. In this case as well, an advantage similar to that of the elastic body 16 shown in FIG. 11 can be obtained.

In the elastic body 16 shown in FIG. 14, a plurality of first structures 16-1 can be made into one ring-shaped first structure 16-1 as shown in FIG. 15. In this case as well, an advantage similar to that of the elastic body 16 shown in FIG. 14 can be obtained.

(Structure of Strain Sensor)

Figure 16:
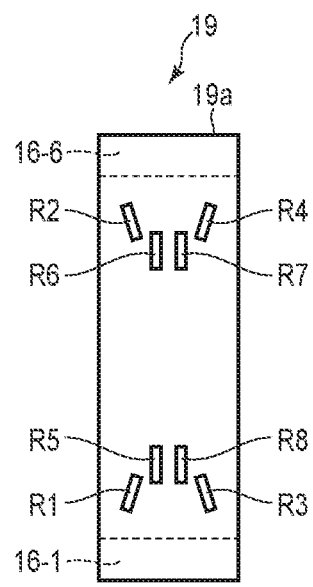
FIG. 16 is a plan view showing an example of the strain sensor.

FIG. 16 shows an example of the strain sensor 19. As described above, the strain sensor 19 is constituted by a strain body 19a and a plurality of strain gauges R1 to R8 provided on the surface of the strain body 19a. The strain body 19a is formed of metal and has a thickness less than its width. Therefore, the strain body 19a can be easily deformed in the thickness direction and not easily deformed in the width direction.

One end portion of the strain body 19a is provided in the first structure 16-1 and the other end portion is provided in the relay portion 16-6 of the respective second structure 16-2. The strain gauges R1, R3, R5 and R8 are provided in the vicinity of the one end portion of the strain body 19a, the strain gauges R2, R4, R6, R7 are provided in the vicinity of the other end portion of the strain body 19a.

FIG. 17 shows an example of the bridge circuit which uses the strain gauges R1 to R8. The strain gauges R1, R2, R3 and R4 constitute a first bridge circuit BC1, and the strain gauges R5, R6, R7 and R8 constitute a second bridge circuit BC2.

In the first bridge circuit BC1, a series circuit of the strain gauge R2 and the strain gauge R1 and a series circuit of the strain gauge R4 and the strain gauge R3 are placed between a power source V and a ground GND. An output voltage Vout+ is output from a connection node between the strain gauge R2 and the strain gauge R1, and an output voltage Vout− is output from a connection node between the strain gauge R4 and the strain gauge R3. The output voltage Vout+ and the output voltage Vout− are supplied to an operational amplifier OP1, and the output voltage Vout is output from an output terminal of the operational amplifier OP1.

In the second bridge circuit BC2, a series circuit of the strain gauge R6 and the strain gauge R5 and a series circuit of the strain gauge R8 and the strain gauge R7 are placed between the power source V and the ground GND. An output voltage Vout+ is output from a connection node between the strain gauge R6 and the strain gauge R5, and an output voltage Vout− is output from a connection node of the strain gauge R8 and the strain gauge R7. The output voltage Vout+ and the output voltage Vout− are supplied to an operational amplifier OP2, and the output voltage Vout is output from an output terminal of an operational amplifier OP2.

As described above, the strain body 19a is deformed into an S-shape by the force of, for example, the Fz direction, and thus a high output voltage can be obtained from the first bridge circuit BC1 and the second bridge circuit BC2.

Note that the arrangement of the strain gauges R1 to R8 with respect to the strain body 19a and the structures of the bridge circuits BC1 and BC2 are not limited to this, but they can be modified.

(Structure of Stopper)

The stopper 30 will be further described.

Generally, for the stopper, a cylindrical stopper member and a circular opening in which the stopper member is contained, are used. In the case of a stopper of this structure, a gap between a side surface of the stopper member and an inner surface of the opening is uniform in each of the axial directions. Therefore, when the rigidity of the elastic bodies provided on the strain body varies from one axis to another, a high load is applied at an operating point of the stopper in a shaft of high rigidity, thus making it difficult to reliably prevent breaking of the strain body.

Figures 18, 19:
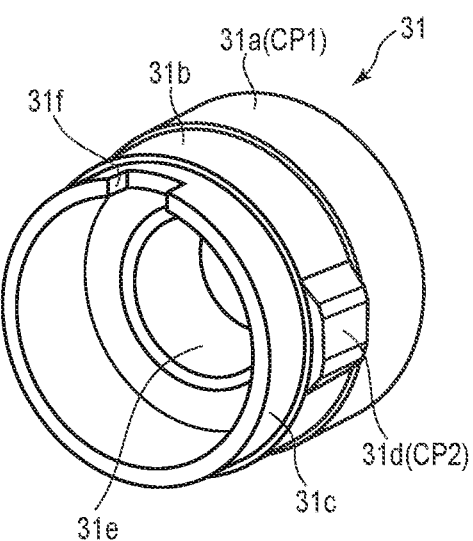
FIG. 18 is a diagram indicating an example of the amount of displacement in six axes of the sensor body.
FIG. 19 is a perspective view showing an example of a stopper member according to this embodiment.

FIG. 18 shows an example of the amount of displacement with respect to six axes of the sensor body (the elastic body 16 and the strain body 19a). As shown in FIG. 18, when different safety factors are set for the amount of displacement of each of the six axes in the rating of the sensor body, the operable range of each axis will be different.

More specifically, the operable range of the sensor body in the Fx, Fy and Mz directions is smaller than the operable range of the sensor body in the Fz, Mx and My directions. In other words, the operable range of the strain body 19a in the width direction is smaller than the operable range of the strain body 19a in the thickness direction.

Thus, when the operable range differs from one axis to another in the sensor body, in the cylindrical stopper member and the circular opening, a high load is applied at an operating point of the stopper in a direction where the operable range is small, thus making it difficult to sufficiently protect the strain body.

Figure 20A:
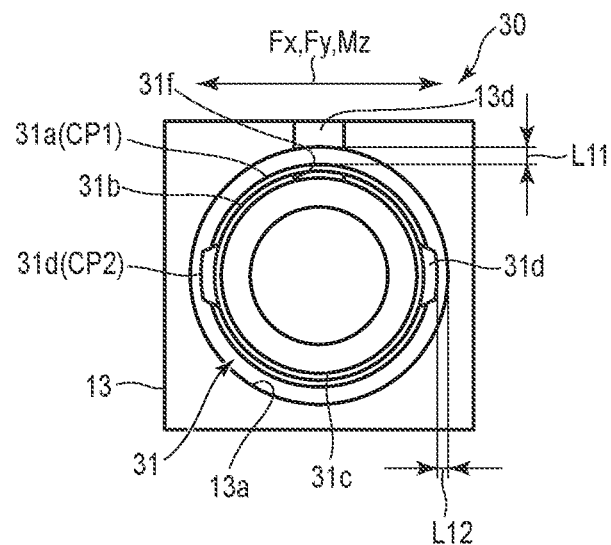
FIG. 20A is a front view of a stopper according to the present embodiment.
Figure 20B:
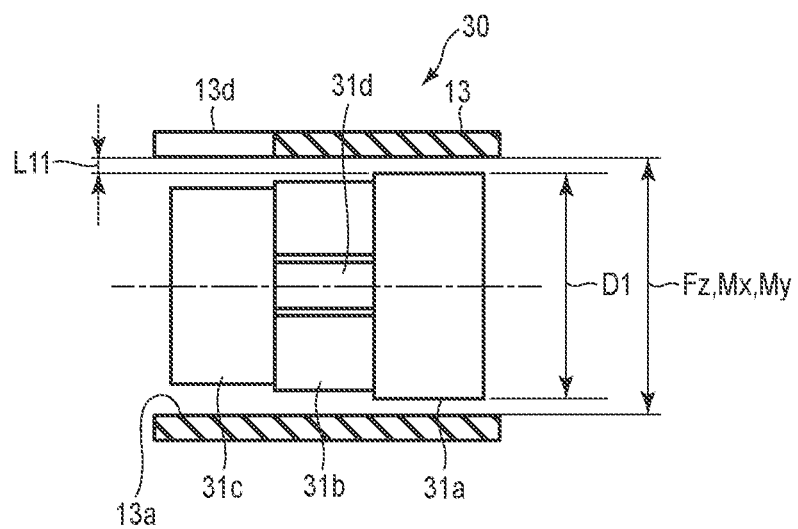
FIG. 20B is a side view showing a part of the illustration of FIG. 20A as a cross section.

FIGS. 19, 20A and 20B show the stopper member 31 according to this embodiment.

The stopper member 31 comprises, for example, a first portion 31a, a second portion 31b, a third the portion 31c, which are of different diameters, two projections 31d, an opening 31e in which a screw 32 is inserted, and a slit 31f.

The first portion 31a has a first diameter D1 and a diameter of the second portion 31b is less than the diameter of first portion 31a, and a diameter of the third portion 31c is less than the diameter of the second portion 31b. The two projections 31d are provided on the second portion 31b. These projections 31d are provided on respective sides of the second portion 31b to correspond to, for example, a direction (Fx, Fy, Mz directions) where the operable range of the elastic body 16 (the strain body 19a) is small. The surface of each of the projections 31d is curved along the inner surface of the opening 13a.

In FIGS. 20A and 20B, L11 indicates an interval (distance) between the first portion 31a and the inner surface of the opening 13a of the mounting plate 13. The interval L11 is, for example, an interval of the direction where the operable range of the elastic body 16 is large (Fz, Mx, My directions, that is, the thickness direction of the strain body 19a). Further, L12 indicates an interval between the projection 31d and the inner surface of the opening 13a. The interval L12 is, for example, an interval of the direction wherein the operable range of the elastic body 6 is small (Fx, Fy, Mz direction, that is, the width direction of the strain body 19a). The relationship between L11 and L12 is represented as L11>L12.

More specifically, in the case of the example shown in FIGS. 20A and 20B, L11 should preferably be, for example, 0.21 mm, and L12 be, for example, 0.11 mm.

That is, the interval L12 of the direction (Fx, Fy, Mz direction) where the strain body 19a is not easily deformed, is set narrower than the interval L11 of the direction (Fz, Mx, My direction) where it is easily deformed.

Note that a part corresponding to the interval L11 of the stopper member 31 is a first contact portion (CP1) in contact with the inner surface of the opening 13a, and a part corresponding to the interval L12 is a second contact portion (CP2) in contact with the inner surface of the opening 13a.

The third portion 31c is a part where a cylindrical jig (denoted by reference number 80 in FIG. 2) is mounted so as to adjust the interval between the stopper member 31 and the opening 13a.

The slit 31f is provided in the third portion 31c. A center of the slit 31f is disposed at a position corresponding to the center of the linear line connecting the centers of the two projections 31d.

As shown in FIGS. 2 and 4, the slit 13d is provided at the position corresponding to the stopper 30 of the mounting plate 13. The slit 13d is communicated to the opening 13a and is further made communicable to the slit 31f as well provided in the third portion 31c of the stopper member 31.

Figure 21:
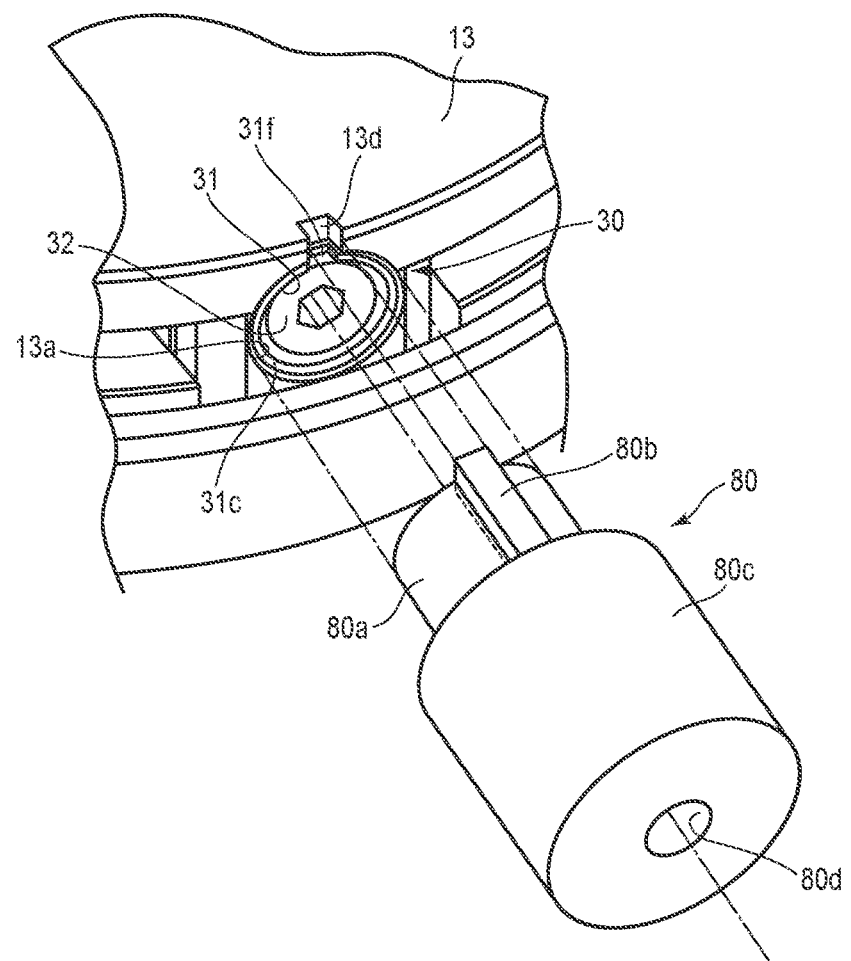
FIG. 21 is a perspective diagram showing the relationship between the stopper and a jig.

FIG. 21 shows the stopper 30 in enlargement. The interval between the stopper member 31 and the opening 13a is adjusted using a jig 80. The jig 80 comprises an insertion portion 80a, a key 80b and a knob 80c.

The insertion portion 80a is formed to be cylindrical, and the thickness of the cylinder is approximately equal to a distance between the side surface of the third portion 31c and the inner surface of the opening 13a. The distance between the side surface of the third portion 31c and the inner surface of the opening 13a is greater than the first interval L11.

The key 80b is provided in the insertion portion 80a, and placed along an axial center of the jig 80. The key 80b has a shape approximately similar to a combined shape of the slit 31f of the stopper member 31 and the slit 13d of the mounting plate 13 on top of one another.

The knob 80c has, for example, a columnar shape, and comprises a hole 80d which penetrates the insertion portion 80a along its axial center. In the hole 80d, for example, a hexagon head wrench (not shown) is to be inserted to fix the stopper member 31.

In order to adjust the interval between the stopper member 31 and the opening 13a, the respective screw 32 shown in FIGS. 2 and 21 is loosened, and the jig 80 is inserted to the stopper 30. More specifically, the insertion portion 80a of the jig 80 is inserted between the third portion 31c of the stopper member 31 and the opening 13a.

The thickness of the insertion portion 80a of the jig 80 is approximately equal to the distance between the side surface of the third portion 31c and the inner surface of the opening 13a. With this structure, the intervals L11 and L12 shown in FIG. 20A can be set by only inserting the insertion portion 80a to between the third portion 31c and the opening 13a.

Further, as the jig 80 is mounted to the stopper 30, the key 80b of the jig 80 is inserted to the slit 31f of the stopper member 31 and the slit 13d of the amounting plate 13. With this structure, the position of the projection 31d of the stopper member 31 can be set parallel to the X-Y plane.

While the jig 80 being mounted into the stopper 30, a hexagon head wrench is inserted to the hole 80d to fasten the screw 32, and thus the stopper member 31 is fixed to the main body 11 and thus the adjusting of the stopper member 31 is completed.

In the case where the stopper member 31 functions as a stopper, when the elastic body 16 is deformed into the direction (Fz, Mx, My direction) where the strain body 19a can be easily deformed, the first portion 31a of the stopper member 31 is brought into contact with the inner surface of the opening 13a, whereas the second portion 31b, the third portion 31c and the projection 31d are not brought into contact with the inner surface of the opening 13a.

When the elastic body 16 is deformed in the direction (Fx, Fy, Mz direction) where the strain body 19a cannot be easily deformed, the first portion 31a, the second portion 31b and the third portion 31c of the stopper member 31 are not brought into contact with the inner surface of the opening 13a, whereas the projection 31d is brought into contact with the inner surface of the opening 13a. Thus, the strain body 19a is protected.

(Effect of Stopper)

According to the above-described structure, the second portion of the stopper member 31 comprises a pair of projections 31d in the direction where the operable range of the strain body 19a is small (Fx, Fy, Mz, the width direction of the strain body 19a), and the interval L12 between the inner surface of the opening 13a of the mounting plate 13 and the projection 31d is set less than the interval L11 between the first portion 31a of the stopper member 31 and the inner surface of the opening 13a of the mounting plate 13. With this structure, in the direction where the operable range of the strain body 19a is small, it is possible to prevent the operating point of the stopper from being applied at a high load, thus making it possible to sufficiently protect the strain body 19a.

Further, the strain body 19a can be deformed sufficiently in the rated operable range, and therefore a high sensor output can be obtained. Therefore, a high-precision force sensor can be implemented.

Further, with use of the stopper 30 of this embodiment, it is possible to allow for non-uniformity of the rigidity among the six axial directions of the sensor body. When equalizing the rigidity values of the six axial directions of the sensor body, the size in shape of the elastic body 16 and the strain body 19a is generally increased. However, with use of the stopper 30 of this embodiment, it is possible to allow the non-uniformity of the rigidity among the six axial directions of the sensor body, and therefore the upsizing of the elastic body 16 and the strain body 19a can be prevented, thereby making it possible to implement a small-sized force sensor.

Modified Examples of the Stopper

In the stopper member 31 discussed above, two projections 31d are provided in the second portion 31b, but the structure of the stopper 30 and the like is not limited to that of the example provided above.

First Modified Example

FIG. 22 shows the first modified example of the stopper 30. In the stopper 30 shown in FIG. 20A, a projection 31d is provided in the second portion 31b of the stopper member 31. By contrast, in the first modified example, the second portion 31b of the stopper member 31 does not comprise a projection 31d, but it has a cylindrical shape and a pair of projections 13b are provided on an inner surface portion of the opening 13a, which corresponds to the second portion 31b.

More specifically, the pair of projections 13b are provided on each opposing surface of the opening 13a in the Fx, Fy and Mz directions, respectively. The projections 13b each comprise a flat surface, and the interval between the surface of the projection 13b and the surface of the second portion 31b is represented by L12. The reason why the projection 13b comprises a flat surface, is to avoid the projection 13b from being brought into contact with the second portion 31b of the stopper member 31 when the stopper member 31 moves in the Z-axis direction of the opening 13a.

Second Modified Example

FIG. 23 shows the second modified example of stopper 30. In the second modified example, the shape of the opening 13a is circular as in the case of FIG. 20A, and the shape of the second portion 31b of the stopper member 31 is elliptical.

More specifically, a major axis of the ellipse is placed along the Fx, Fy and Mz directions, and an interval between one end portion and the other end portion of the major axis and the inner surface of the opening 13a is set as L12. Therefore, the major axis portion of the ellipse can carry out an operation similar to that of the projection 31d.

Third Modified Example

Figure 24:
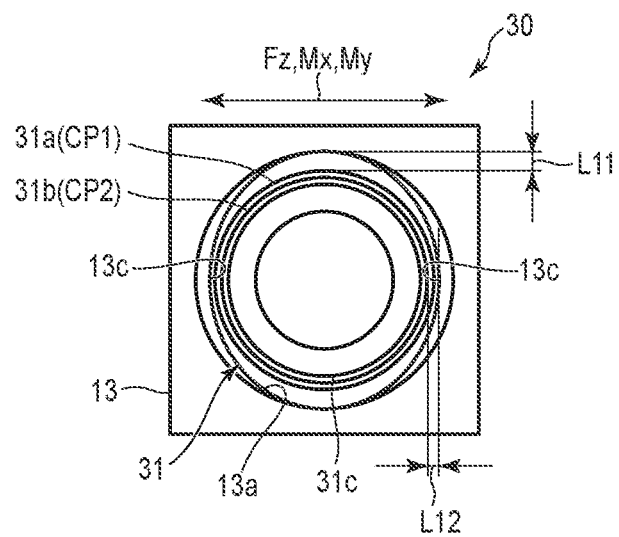
FIG. 24 is a front view showing the third modified example of the stopper.

FIG. 24 shows the third modified example of the stopper 30. In the second modified example shown in FIG. 23, the shape of the second portion 31b of the stopper member 31 is elliptical. By contrast, in the third modified example, the shape of the second portion 31b of the stopper member 31 is circular, whereas the shape of a portion 13c of the opening 13a, which corresponds to the second portion 31b of the stopper member 31 is elliptical.

More specifically, in the portion 13c of the opening 13a, a minor axis of the ellipse is placed in the Fx, Fy and Mz directions, and an interval between the second portion 31b of the stopper member 31 and the inner surface of the portion 13c of the opening 13a is represented by L12.

According to the first to third modified examples, an advantage similar to that of the example shown in FIGS. 19, 20A and 20B can be obtained.

Fourth Modified Example

Figure 25A:
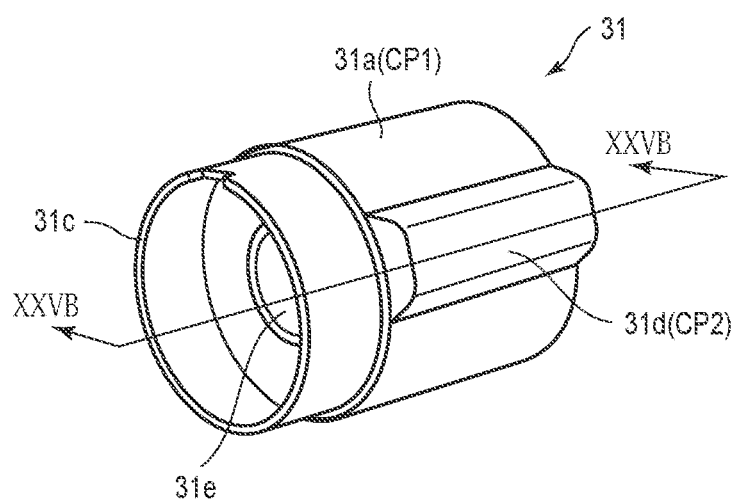
FIG. 25A is a perspective diagram showing the fourth modified example of the stopper.
Figure 25B:
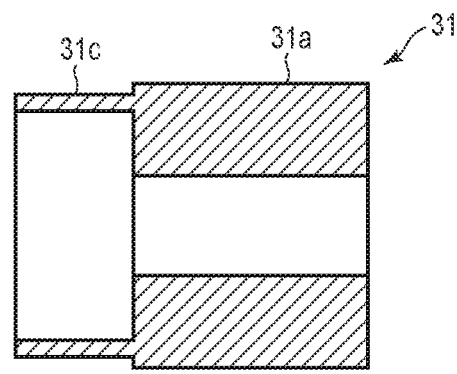
FIG. 25B is a cross section taken along line XXVB-XXVB shown in FIG. 25A.

FIGS. 25A and 25B show the fourth modified example of the stopper 30, and they show only the stopper member 31. The stopper member 31 shown in FIG. 19 includes a first portion 31a, a second portion 31b and a third portion 31c, and a pair of projections 31d are provided in the second portion 31b. Thus, in the case of the structure comprising a plurality of steps, high-precision processing can be performed easily. But, the second portion 31b is not necessarily essential.

As shown in FIGS. 25A and 25B, in the fourth modified example, the stopper member 31 does not comprise a second portion 31b and a pair of projections 31d are provided in the first portion 31a.

With the stopper member 31 of the structure shown in FIGS. 25A and 25B, a function and an effect similar to those of the stopper member 31 shown in FIG. 19 can be obtained.

Fifth Modified Example

Figure 26:
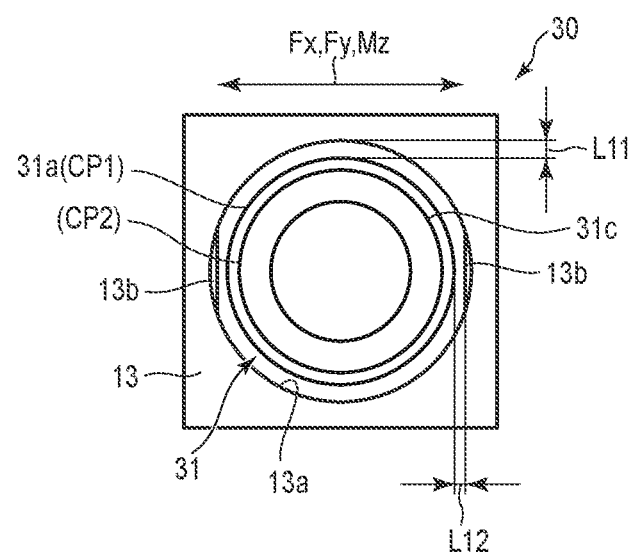
FIG. 26 is a front view showing the fifth modified example of the stopper.

FIG. 26 shows the fifth modified example of the stopper 30. As in the fourth modified example, according to the fifth modified example, the stopper member 31 does not comprise a second portion 31b, and the first portion 31a does not comprise a pair of projections 31d and is cylindrical.

An inner surface portion of the opening 13a, which corresponds to the first portion 31a, comprises a pair of projections 13b. The pair of projections 13b are provided in each opposing surface of the opening 13a in the Fx, Fy and Mz directions, respectively, and the surface of the projection 13b is made flat. The interval between the surface of the projection 13b and the first portion 31a of the stopper member 31 is L12 and the interval between an inner surface portion of the opening 13a except for the projection 13b and the side surface of the first portion 31a is L11.

Sixth Modified Example

Figure 27:
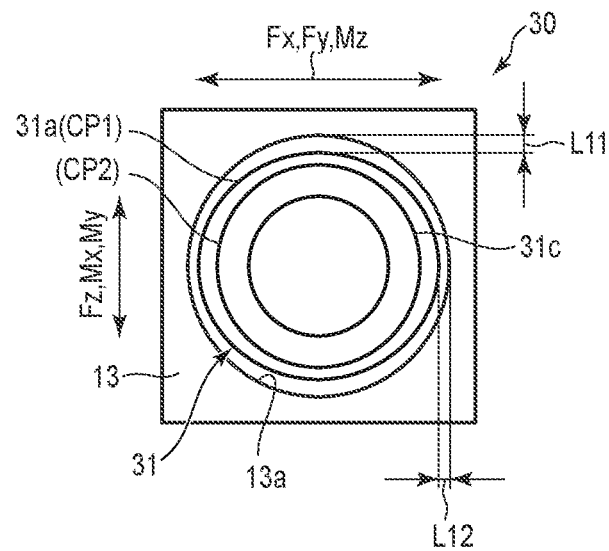
FIG. 27 is a front view showing the sixth modified example of the stopper.

FIG. 27 shows the sixth modified example of the stopper 30. As in the fourth modified example, according to the sixth modified example, the stopper member 31 does not comprise a second portion 31b, and also comprises a first portion 31a and a third portion 31c. The first portion 31a is elliptical. A major axis of the ellipse is placed in the Fx, Fy and Mz directions, and a minor axis of the ellipse is placed in the Fz, Mx and My directions.

The opening 13a is circular. In the first portion 31a, the interval between one end portion and the other end portion of the major axis of the ellipse and the inner surface of the opening 13a is L12 and the interval between one end portion and the other end portion of the minor axis of the ellipse and the inner surface of the opening 13a is L11.

Seventh Modified Example

Figure 28:
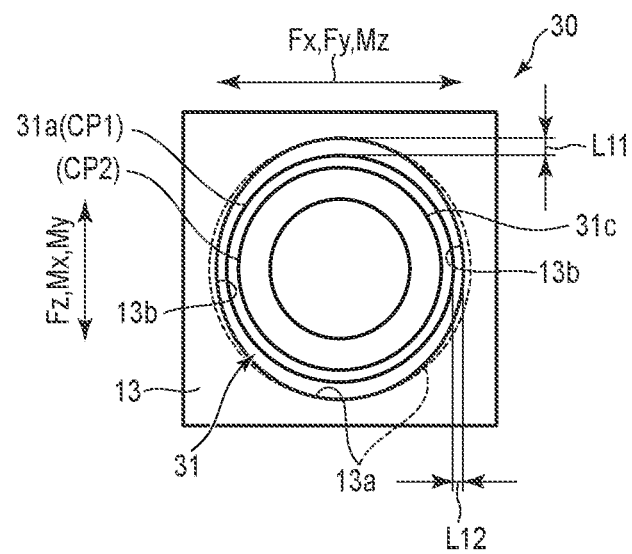
FIG. 28 is a front view showing the seventh modified example of the stopper.

FIG. 28 shows the seventh modified example of the stopper 30. As in the case of the fourth modified example, according to the seventh modified example, the stopper member 31 does not comprise a second portion 31b, but comprises a first portion 31a and a third portion 31c. The first portion 31a and the third portion 31c are cylindrical.

A portion corresponding to the first portion 31a of the opening 13a is elliptical, and a minor axis of the ellipse is placed in the Fx, Fy and Mz directions, and a major axis of the ellipse is placed in the Fz, Mx and My directions. An interval between one end portion and the other end portion of the minor axis of the ellipse and the inner surface of the opening 13a is L12, and an interval between one end portion and the other end portion of the major axis of the ellipse and the inner surface of the opening 13a is L11.

A portion corresponding to the third portion 31c of the opening 13a is circular as indicated by a broken line. But, if the outer diameter of the insertion portion 80a of the jig 80 is elliptical, the entire opening 13a may be made elliptical.

According to the fifth to seventh modified examples, an advantage similar to that of the example shown in FIGS. 19, 20A and 20B can be obtained.

The stopper 30 described above comprises a cylindrical or partially elliptical stopper member 31 and a circular or elliptical opening 13a. But, the shapes of the stopper member 31 and the opening 13a are not limited to those of this example.

Eighth Modified Example

FIGS. 29 and 30 show the eighth modified example of the stopper 30. In the eighth modified example, the first portion 31a of the stopper member 31 is, for example, a square in which a length E1 of sides in the Fx, Fy and Mz directions and a length E2 of sides in the Fz, Mx and My directions are equal to each other.

The shape of the opening 13a portion corresponding to the first portion 31a is rectangular. Short sides of the rectangle are placed in the Fx, Fy and Mz directions, and long sides of the rectangle are placed in the Fz, Mx and My directions. An interval between a short side of the rectangle and the first portion 31a of the stopper member 31 is L11, and an interval between a long side of the rectangle and the first portion 31a of the stopper member 31 is L12.

In the opening 13a, the portion corresponding to the third portion 31c of the stopper member 31 is circular as indicated by a broken line. Therefore, the stopper member 31 can be positioned using the jig 80.

Ninth Modified Example

FIG. 31 shows the ninth modified example of the stopper 30. In the ninth modified example, the shape of the opening 13a, which corresponds to the first portion 31a of the stopper member 31 is a square. The first portion 31a of the stopper member 31 is rectangular, and a length E1 of a long side of the rectangle in the Fx, Fy and Mz directions is longer than a length E2 of a side in the Fz, Mx and My directions.

In the stopper member 31, an interval between a short side of the rectangle and the inner surface of the opening 13a is L12, and an interval between a long side of the rectangle and the inner surface of the opening 13a is L11.

In the opening 13a, the portion corresponding to the third portion 31c of the stopper member 31 is circular as indicated by a broken line. Therefore, the stopper member 31 can be positioned using the jig 80.

According to the eighth and ninth modified examples, an effect similar to those of the first to seventh modified examples can be obtained.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A force sensor comprising:
a main body;
a movable body movable with respect to the main body;
an elastic body fixed to the main body and the movable body and deformable according to movement of the movable body;
a strain sensor provided on the elastic body and including a strain body;
an opening formed in the movable body;
a stopper member provided inside the opening, including a first contact portion and a second contact portion distances of which from the opening are different from each other; and
a fixing member fixing the stopper member to the main body,
the opening is circular, the stopper member is cylindrical, and
the first contact portion is an outer surface of the stopper member corresponding to a first direction, and the second contact portion is two projections provided on the outer surface of the stopper member corresponding to a second direction, wherein the movable range of the strain body is greater in the first direction than the second direction.

2. The force sensor of claim 1, wherein
a distance between the first contact portion and an inner surface of the opening is a first distance, a distance between the second contact portion and an inner surface of the opening is a second distance, and the second distance is less than the first distance.

3. The force sensor of claim 1, wherein
the stopper member comprises a first portion and a second portion having a diameter less than a diameter of the first portion, and the projection is provided on the second portion.

4. The force sensor of claim 3, wherein
the stopper member comprises a third portion provided on the second portion and having a diameter less than the diameter of the second portion.

5. The force sensor of claim 4, wherein
a distance between a side surface of the third portion of the stopper member and the inner surface corresponding to the third portion of the opening is greater than the first distance.

6. The force sensor of claim 5, wherein
the third portion comprises a first slit, and
the movable body comprises a second slit communicating to the opening and corresponding to the first slit.

7. The force sensor of claim 6, further comprising:
a jig inserted between the side surface of the third portion of the stopper member and the inner surface corresponding to the third portion of the opening.

8. The force sensor of claim 7, wherein
the jig comprises a key integrally inserted to the first slit and the second slit.

* * * * *